United States Patent [19]

Ellerbroek

[11] Patent Number: 4,690,555
[45] Date of Patent: Sep. 1, 1987

[54] SOLID-STATE WAVEFRONT SLOPE DETERMINATION

[75] Inventor: Brent L. Ellerbroek, Los Angeles, Calif.

[73] Assignee: Hughes Aircraft Company, Los Angeles, Calif.

[21] Appl. No.: 793,941

[22] Filed: Nov. 1, 1985

[51] Int. Cl.$^4$ .............................................. G01J 1/00
[52] U.S. Cl. ..................................... 356/121; 250/201
[58] Field of Search ................ 250/201, 202; 356/121, 356/122, 353, 354

[56] References Cited

U.S. PATENT DOCUMENTS

| | | | |
|---|---|---|---|
| 4,378,490 | 3/1983 | d'Auria Luigi | 250/201 |
| 4,490,039 | 12/1984 | Bruckler et al. | 356/121 |
| 4,518,854 | 5/1985 | Hutchin | 250/201 |

*Primary Examiner*—Eugene R. Laroche
*Assistant Examiner*—Steven J. Mottola
*Attorney, Agent, or Firm*—Ronald L. Taylor; A. W. Karambelas

[57] ABSTRACT

An adaptive laser system (10) incorporates a laser (12) and a novel system and method for determining the slope distribution of a laser beam wavefront. The sensor comprises a ramp filter (16) with a continuous monotonically varying transmittance function and two intensity distribution sensors (18 and 20). Lenses (24, 26 and 28) are provided for focusing and collimating the laser beam as appropriate. A processor (22) calculates the slope distribution from the two intensity distributions obtained by the intensity sensors. The slope calculations can be used to determine commands to predistort the laser beam to approximate a desired flat wavefront at the sensor. The transmittance function of the ramp filter is linear and its spatial width is considerably larger than the expected spreading of the beam due to distortions in the wavefront. Accordingly, the slope distribution is calculated by pointwise differencing the intensities, normalizing by dividing by the sum of the intensities, and scaling by a factor of one half. Accordingly, a solid state slope sensor which is fast, reliable, economical, and capable of high-resolution evaluations of pulsed as well as continuous wave laser beams is provided.

11 Claims, 2 Drawing Figures

SOLID-STATE WAVEFRONT SLOPE DETERMINATION

BACKGROUND OF THE INVENTION

The present invention relates to lasers, and, more particularly, to a system and method for determining the wavefront slope of a laser beam.

Wavefront slope sensors are used, for example, in adaptive optical systems to determine the adjustment necessary to compensate for wavefront distortions produced by the optical train and/or the intervening medium. In most applications, the ideal is a zero wavefront slope over the cross-section of the beam. A non-zero slope indicates distortion and dispersion of the beam, the result being a diminished power delivery.

The outgoing beam can be predistorted, for example, by varying the pressure applied across a deformable primary mirror, as a function of the measured slope distribution. In this way, an appropriate slope-related parameter can be minimized to enhance the power delivered.

The criteria according to which wavefront slope sensors are evaluated include reliability, speed, resolution and cost. Another primary consideration is the flexibility for use with both pulsed and continuous wave lasers.

Several of the available or described slope sensors include moving elements. The movements may be used to sample different parts of the beam, or to provide multiple measurements of a single part of the beam as necessary to compute the slope. Such systems are disadvantageous in that they are generally limited to continuous wave applications. Also, the time involved in the mechanical movements limits the measurement speed of the system. This is particularly problematic where real-time adjustments are required. Furthermore, the incorporation of moving parts reduces the reliability and increases the cost of the system.

There is another class of wavefront slope sensors which use multiple subapertures in sampling the laser beam. For example, Hartman-type sensors use a grating which defines multiple subapertures The average slope within each subaperture is determined, and the collective determination provide a slope distribution for the beam.

The major problem with the grating sensors is the difficulty of manufacturing high resolution gratings. Additionally, a significant percentage of the incident light can be lost by reflections at the grating. Also, diffraction effects become more severe at smaller apertures. Finally, it turns out that the mechanical aperture sensors have greater computational requirements by about a factor of three or four. Thus, real-time performance is impaired.

Heretofore, the disclosed and available sensors have provided a choice between the limitations of systems with mechanical movement and those with mechanical grids of subapertures. What is needed is reliable, cost-effective, fast wavefront sensing which efficiently processes data, provides for high-resolution sensing, and is applicable to pulsed as well as continuous wave applications.

SUMMARY OF THE INVENTION

In accordance with the present invention, a laser beam is split according to a continuous monotonic function of spatial position; the wavefront slope distribution is computed from the intensity distributions of the resulting components. The foregoing is conducted in the context of an adaptive optics system having an adaptable laser source and a wavefront slope sensor.

The wavefront slope sensor inclutes a ramp filter and two intensity distribution sensors. The slope sensor can also include a lens for focusing the laser beam at the ramp filter and additional lenses or means for collimating the component beams between the ramp filter and the respective intensity distribution sensors. A processor calculates the wavefront slope distribution from the pair of intensity distributions.

In one realization of the present invention, the processor performs a pointwise differencing of the intensity distributions. Normalization is effected by pointwise division by the pointwise sum of the intensity distribution. The result is scaled according to a theoretically or empirically derived function. In the case of a linear ramp function and a relatively large spatial diameter, the scaling function is a constant division by two.

The ramp filter can be a partially reflecting and partially transmitting optical element. The transmittance function should be continuous and monotonic. In a system for determining two-dimensional slope distributions, the direction of variation in transmittance for two ramp filters should be perpendicular or at least non-collinear.

In accordance with the foregoing and the following detailed description, the present invention provides for solid state wavefront slope determinations. The lack of moving parts and the simplicity of the components provide high reliability at low cost. In addition, the sensing is effective with pulsed as well as continuous wave applications. The lack of mechanical subapertures and the use of readily available intensity distribution sensors provide for ready scalability to high resolution. The incorporated algorithm is more efficient than the algorithms used on available sensors, so that real-time processing is made more practical. Other features and advantages are apparent from the detailed description below.

DETAILED DESCRIPTION OF THE PREFERRED EMBODIMENTS

Figure 1:
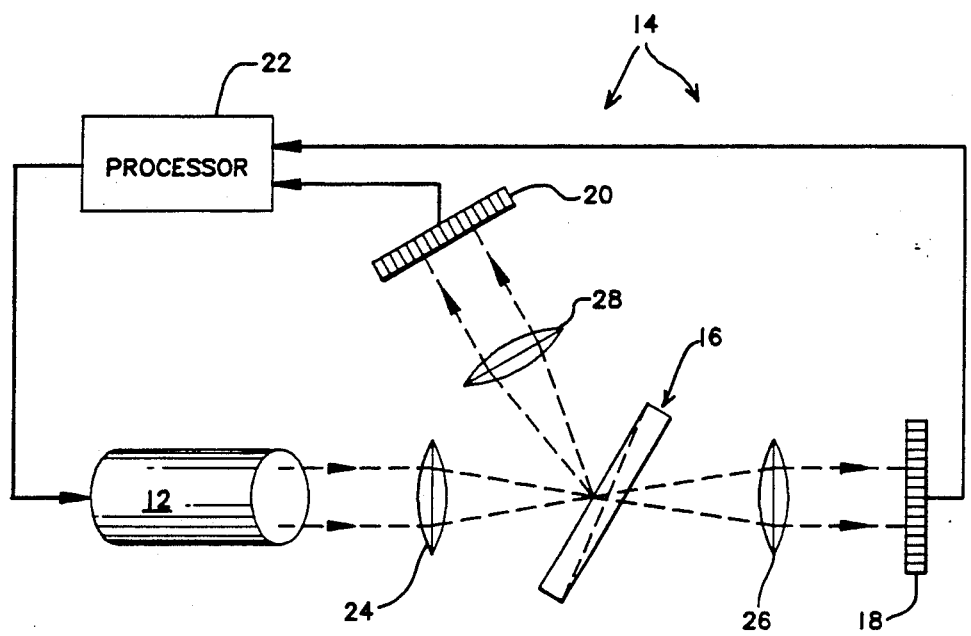
FIG. 1 is a schematic of an adaptive laser system incorporating the present invention.

An adaptive laser system 10 includes an adaptable laser 12 and a wavefront slope sensor 14, as illustrated in FIG. 1. The wavefront slope sensor has a ramp filter 16, intensity distribution sensors 18 and 20, and processor 22. The wavefront slope sensor also includes a focusing lens 24 or other means for focusing the laser beam at the ramp filter, and collimating lenses 26 and 28 or other means for collimating the beams between the ramp filter and the respective intensity distribution sensors 18 and 20.

The ramp filter 16 is a partially transmitting and partially reflecting optical element. In the illustrated system 10, the ramp filter 16 is optically flat and has a spatially varying transmittance function. More specifically, the illustrated ramp filter 16 has a transmittance function which varies linearly in one dimension, and is constant in the transverse dimension.

The operation of the illustrated system is first described in the case of a laser beam with an ideally flat wavefront. The beam is generated by the laser 12 and is focused by lens 24 to a point at the center of the ramp filter 16. The beam is split into two equal components. One component is reflected and then collimated by collimating lens 28; the intensity distribution of the reflected component is detected by intensity sensor 20. The transmitted component is collimated by lens 26 and detected by sensor 18. The intensity data collected by the sensors 18 and 20 is communicated to processor 22.

The processor 22 pointwise differences the intensity distributions. Since the beams are identical, the differences are zero, and normalization and scaling do not affect this zero determination. Since the slope is determined to be uniformly zero, no deformation commands are sent to the laser 12.

In the case of a distorted laser beam, the spot is somewhat dispersed at the ramp filter 16. Accordingly, for some parts of the beam, the ratio of transmission to reflection is greater than 1:1, for some parts the ratio is less than 1:1, and for some parts of the beam the ratio is substantially 1:1. As a result, some pairs of corresponding subapertures of the intensity sensors detect different incident intensities. The discrepancies are revealed as non-zero differences at the processor. After normalizing and scaling, the processor 22 sends deformation commands to the adaptable laser to correct the laser beam.

In many applications, a two-dimensional slope distribution is required. Accordingly, an beam splitter can be used to provide samples to each of two orthogonal slope sensors. The slope sensors are orthogonal if their directions of varying transmittance, taken relative to their respective beams, are orthogonal.

Figure 2:
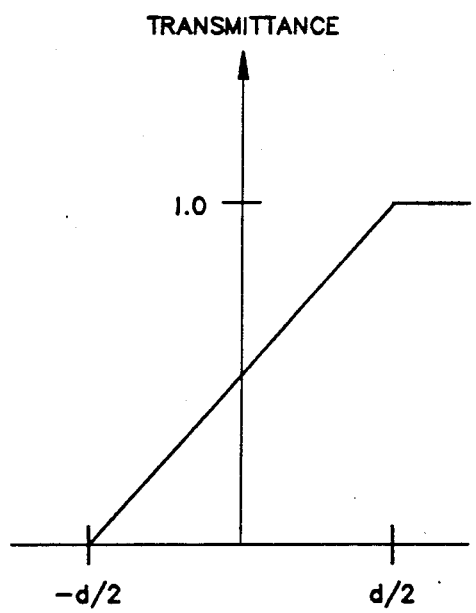
FIG. 2 is a transmittance function for a ramp filter incorporated in the laser system of FIG. 1.

The transmittance function of the illustrated ramp filter 16 is linear over its spatial diameter d, as illustrated in FIG. 2. Such a ramp filter can be manufactured simply and cost effectively by masking a portion of glass and depositing aluminum over the partially masked glass. The aluminum can be allowed to diffuse under the mask to define the desired continuous monotonic function. The process should be adjusted so that the spatial diameter is large, e.g. by a factor of four or five, relative to the expected spot size of the laser beam at the ramp filter.

It should be understood that the specifications of linearity and for spatial diameter are not critical. They are selected for their theoretical simplicity. However, considerable variation in ramp filters can be accommodated in connection with empirical calibration of the completed sensor and/or laser system.

Considering the illustrated laser system 10 in greater detail, the laser 12 includes a deformable primary mirror (not shown). The primary mirror can te deformed by expansion or contraction of piezoelectric actuators in response to commands determined by the processor 22. The laser 12 generates a beam, a sample of which is directed to the wavefront slope sensor 14. A focusing lens 24 focuses the beam at the ramp filter 16.

The ramp filter 16 is shown oriented obliquely relative to the original laser beam so the optical train of the reflected component does not interfere with the original optical path. The illustrated ramp filter 16 is shown with a length equal to its spatial width, with 100% transmittance at the top and 100% reflection at the bottom, and 50% transmittance and 50% reflectance at the center. The illustrated filter 16 is embedded in a larger glass element (not shown), upon which the filter 16 was formed.

The subapertures of the laser beam incident to the center line of the ramp filter 16 are split 1:1 between the transmitted and reflected optical paths. With respect to beam subapertures incident above the center, a greater component is transmitted; with respect to beam subapertures incident below center, a greater component is reflected. As indicated above, the transmitted and reflected components are collimated by colliminating lenses 26 and 28 prior to detection by the intensity sensors 18 and 20.

The intensity sensors are located at imaging planes of the laser beam. The illustrated intensity sensors 18 and 20 are common CCD detectors in a 64×64 array. Obviously, different array configurations can be employed. Other embodiments utilize sensors with much greater resolution, the trade-off appearing in the amount of data to be processed in characterizing the laser beam. However, the additional processing is in proportion to the number of detectors or subapertures defined. The reading from each intensity sensor is converted to binary form by an analog-to-digital converter (not shown) as required by the processor 22.

The processor 22 performs the pointwise differencing, and division by sums to normalize. A scaling factor of 0.5 is applied under theoretical considerations in the illustrated system. More generally, the calculation is of the form:

$$s(x) = K[I_t(x) - I_r(x)][I_t(x) + I_r(x)]^{-1}$$

where $s(x)$ is the slope at point x, $I_t(x)$ is the intensity of the transmitted component at the point corresponding to x on the associated intensity sensor, $I_r(x)$ is the intensity of the reflected component at the point corresponding to point x on the associated intensity sensor, and K is a constant.

K equals one-half in the case of a linear ramp filter of infinite spatial diameter. This factor is applicable where the spatial diameter is large relative to the spatial dispersion of the laser beam spot on the ramp filter.

In addition, the processor 22 provides for translations and scalings of the inputs in accordarce with calibration determinations. In the context of the illustrated system, 4 additions/subtractions and 3 multiplication/divisions are performed. The differencing, the calculation of the normalizing figure, and two calibration translations are the 4 addition/subtractions. The normalization, multiplication by a theoretical scaling factor and a calibration factor constitute the three multiplications.

For a two-dimensional system, 8 additions and 6 multiplications would be required per subaperture. This figure compares very favorably with other systems capable of evaluating pulsed lasers. These typically required 64 additions and 18 multiplies per subaperture. The present invention also has a significant computational advantage over systems limited to continuous wave measurements.

The invention provides for many variations and modifications of the illustrated embodiment. On a system level, the dimensioning and dynamic range of the sensor can be adjusted according to the nature of the laser and the relationship of the sensor to the laser. The sensor can be arranged to measure the entire beam, or a sample. The sensor can be arranged to calibrate the beam as it exits the laser or to evaluate the beam at its destination to compensate for intervening sources of distortion.

such as atmospheric anomalies. If used on a sample at the laser source, the sample can be deflected out of the main beam path.

The ramp filter spatial width can be varied. Larger widths can be used for greater dynamic range and smaller values chosen for greater sensitivity. The transmittance function need not be entirely linear. Practically, the transmittance function can approach the extremes asymptotically. The algorithm disclosed renders precise results in the linear central region, yet large dynamic range is available to handle grosser distortions. Other algorithms can be used to achieve full-range precision even at the grosser distortions.

As indicated, other transmittance functions can be applied with appropriate algorithms. The transmittance functions need not be in rectangular coordinates. A transmittance function can extend radially, for example, from a center point on the filter. Furthermore, it is not necessary that the ramp filter be implemented by a partially reflecting and partially transmitting optical element. The ramp filter can be implemented by a beam splitter, with each resulting component passing through a separate graduated transmitting optical element.

The various focusing and collimating elements can be implemented in a variety of ways. Similarly, there is a wide variety of intensity sensors available that can be incorporated by the present invention. The processor is also a generic component. In a carefully calibrated system, some of the processor functions can be implemented by analog components prior to digital conversion. For example, the calibration and scaling can be implemented in analog, leaving the processor to perform the differencing and normalizing digitally.

In accordance with the foregoing an improved method and system for determining the wavefront slope of a laser beam is presented. As indicated, many modifications and variations are within this invention's scope, which is limited only by the following claims.

What is claimed is:

1. A wavefront slope sensor comprising:
   means for obtaining a laser beam sample;
   means for splitting the sample into two components according to a spatially varying transmittance function which is continuous and monotonic;
   means for measuring the intensity distributions of said components; and
   a processor for calculating the wavefront slope from said intensity distributions.

2. A wavefront slope sensor comprising:
   sampling means for obtaining a laser beam sample;
   filter means for splitting the sample into two component beams according to a spatially varying transmittance function which is continuous and monotonic;
   intensity sensor means for measuring the intensity distribution of each component; and
   processor means for pointwise differencing said intensity distributions.

3. The sensor of claim 2 further comprising focusing means for focusing said sample onto said filter means, and collimating means for collimating said components.

4. The sensor of claim 2 further characterized in that said filter means is a partially transmitting and partially reflecting optical element, the transmittance of which varies continuously and monotonically as a function of spatial position.

5. The subsystem of claim 2 further characterized in that said processor means is capable of normalizing and scaling the results of a pointwise differencing.

6. The sensor of claim 5 further characterized in that said processor means normalizes said pointwise differencing by dividing by the pointwise sum of the intensity distributions.

7. A method of characterizing a laser beam, said method comprising the steps of:
   obtaining a laser beam sample;
   splitting said beam sample into first and second component beams according to a spatially varying transmittance function which varies continuously and monotonically with spatial position;
   obtaining first and second intensity distributions of the respective first and second component beams.

8. The method of claim 7 further comprising the step of focusing said sample prior to said splitting, and the step of collimating the component beams.

9. The method of claim 7 further comprising the step of calculating the wavefront slope from said intensity distributions.

10. The method of claim 7 further comprising the step of pointwise differencing said first and second intensity distributions.

11. The method of claim 7 further comprising the steps of obtaining the pointwise difference of the distributions, obtaining the pointwise sum of said distribution, dividing the pointwise difference by the pointwise sum, and scaling the quotient.

* * * * *